United States Patent [19]
Christensen

[11] Patent Number: 5,333,825
[45] Date of Patent: Aug. 2, 1994

[54] FURNITURE ELEVATING DEVICE

[76] Inventor: Emeron P. Christensen, 806 Rachel Pl., Onalaska, Wis. 54650

[21] Appl. No.: 951,585

[22] Filed: Sep. 25, 1992

[51] Int. Cl.$^5$ ............................................. F16M 11/24
[52] U.S. Cl. ................................. 248/188.2; 248/346; 108/144
[58] Field of Search ............... 248/188.2, 346, 346.1, 248/157; 297/345; 108/144

[56] References Cited

U.S. PATENT DOCUMENTS

| | | |
|---|---|---|
| 323,610 | 8/1885 | Van Wie. |
| 994,598 | 6/1911 | Martin. |
| 1,272,636 | 7/1918 | Dittrick. |
| 1,684,925 | 9/1928 | Perlmutter ........................ 248/346 |
| 2,107,629 | 2/1938 | Dallas ................................. 155/88 |
| 2,189,256 | 2/1940 | Stahl .................................. 155/38 |
| 2,605,815 | 8/1952 | Zoranovich ........................ 155/79 |
| 2,722,970 | 11/1955 | Stechmann ........................ 155/88 |
| 2,913,207 | 11/1959 | Eash .................................. 248/148 |
| 2,917,104 | 12/1959 | Cottle ................................ 155/88 |
| 2,935,813 | 5/1960 | Berman et al. .................... 45/139 |
| 3,183,861 | 5/1965 | Halstrick ........................... 108/144 |
| 3,215,382 | 11/1965 | Stein ................................. 248/172 |
| 3,952,983 | 4/1976 | Crochet ............................. 248/346 |
| 5,181,686 | 1/1993 | Barthel ............................. 248/346 |

FOREIGN PATENT DOCUMENTS 1461588  1/1977  United Kingdom ............ 248/188.2

Primary Examiner—Richard K. Seidel
Assistant Examiner—Hwei-Siu Payer
Attorney, Agent, or Firm—M. Paul Hendrickson

[57] ABSTRACT

There is provided an elevating device for elevating furniture equipped with legs (such as a chair) by placing the device beneath the legs of the furniture. The device includes, such in the case of a four legged chair, four adjustable radial arms respectively terminated by a pedestal section for supportively elevating legs of the chair. Each pedestal section is placed beneath a leg and the radial arms are then immobilized by tightly sandwiching the radial arm between a top plate and a bottom plate.

17 Claims, 4 Drawing Sheets

FURNITURE ELEVATING DEVICE

FIELD OF THE INVENTION

The present invention relates to a device for adjusting the height of legged furniture and more particularly adjusting a seat of a chair to an appropriate elevational height.

BACKGROUND OF THE INVENTION

Heretofore numerous devices for adjusting a seat to an appropriate seating height have been proposed. Such devices are often needed to allow for a small person, such as a child, to be seated at a proper level for actively partaking in tabled activities such as eating, writing, coloring, playing games, etc. A common solution to this problem is a high chair equipped with longer chair legs than normal so as to elevate the child to table level.

The patent literature discloses devices for extending the length of legs of legged seating devices such as chairs, stools, benches, etc. For example, in U.S. Pat. No. 994,598 to Martin discloses an adjustable stand equipped with telescoping legs while U.S. Pat. No. 3,183,861 to Halstrick discloses a stool equipped with telescoping legs. In U.S. Pat. No. 1,272,636 to Dietrich there is depicted legged extensions secured onto each chair leg and braced together by diagonally crossing tie rods. Self-latching chair leg extensions for use in combination with tubular chair legs is disclosed in U.S. Pat. No. 2,722,970 to Stechmann. U.S. Pat. No. 2,917,104 to Cottle also discloses an adjustable chair fitted with adjustable leg extensions. U.S. Pat. No. 2,913,207 to Eash discloses a leg extending assembly in which a leg extension is fastened onto each leg. A similar type of leg extension for use in chair legs of an angle iron construction is disclosed in U.S. Pat. No. 2,935,813 to Bermon et al. Another adjustable chair leg extension device for adjustable placement onto each leg of a chair is disclosed in U.S. Pat. No. 2,107,629 to Dallas. U.S. Pat. No. 2,189,256 to Stahl discloses an adjustable chair having leg extensions hinged onto the chair at the base of the chair legs which elevates the chair by hinging the leg extensions onto the chair leg bases.

Other elevating devices designed to be placed on or beneath the seating device are disclosed by the patent literature. For example, U.S. Pat. No. 323,610 to Van Wie discloses a platform for chairs equipped with an extensible bottom. In U.S. Pat. No. 2,605,815 to Zoronovich there is disclosed an elevating child chair seat which fits onto an adult chair seat. An adjustable junior chair lift of a boxed side rail construction with legs seated within the cornering edges of the side rails upon which the elevated chair legs rest is disclosed in U.S. Pat. No. 3,215,382 to Stein.

Notwithstanding a long established need for an economical, compact, safe, and adjustable device for elevating chairs, stools, and tables and other similar furniture with legs, the existing practices have remained substantially unchanged throughout the years.

SUMMARY OF THE INVENTION

The invention provides an elevating device for elevating legged furniture such as a chair to a higher elevational position. The device may be conveniently adapted for use in elevating a variety of legged articles (e.g. chairs, stools, benches, tables, desks, etc.) equipped with legs of varying sizes and arrangements.

The device includes adjustable radial arms respectively terminated by a pedestal section for supportively engaging onto a base of a leg (e.g. a chair leg) and a radial arm restraining assembly for restraining the radial arms. The adjustable radial arms of the device are equal in number to the number of legs of the legged furniture to be supported by the device so each pedestal of a radial arm supports a base of a leg.

The device includes a mechanism for restraining the radial arms once the legs such as chair legs have been placed within their respective pedestals. The restraining assembly may suitably include a top restraining plate and a bottom plate which may be biased together so as to firmly restrain the radial arms following placement of respective chair legs into the pedestals. The underside of the radial arms may be grooved or channeled which in turn mate onto pins positioned at cornering margins of the bottom plate. The grooved channels of the arms are placed upon the pins for slideable adjustment inwardly and outwardly therefrom as well as pivotal movement about the pins.

The respective pedestals may include a socket within which a base of a chair leg may be placed. The sockets may vary in sizes and configuration so as to retainly receive and support differently shaped chair legs. Although the sockets may be of replaceable type of varying depths and configurations, the sockets are preferably of a relatively deep seated type fitted with socket inserts of differing depths which may be inserted into the sockets to vary the socket depth. Thus by placing a socket insert of an appropriate heighth within the recessed cavity, the depth of the socket may accordingly be adjusted to fit the most appropriate elevational level.

The radial arms are sandwiched between the top and bottom plates. Upon adjustment of the radial arms so as to support the legs of the chair, the bottom and top plate may then be tightened together (e.g. such as by tightening bolts) to firmly hold the radial arms in the appropriate position and support of the chair legs.

The above described elevating device may readily be adjusted to fit and appropriately elevate many different types of legged furniture. The elevating device is compact in size notwithstanding its versatility and efficacy in elevating furniture legs. The device may be easily stored and readily installed for use when needed.

DESCRIPTION OF THE INVENTION

Figure 6:
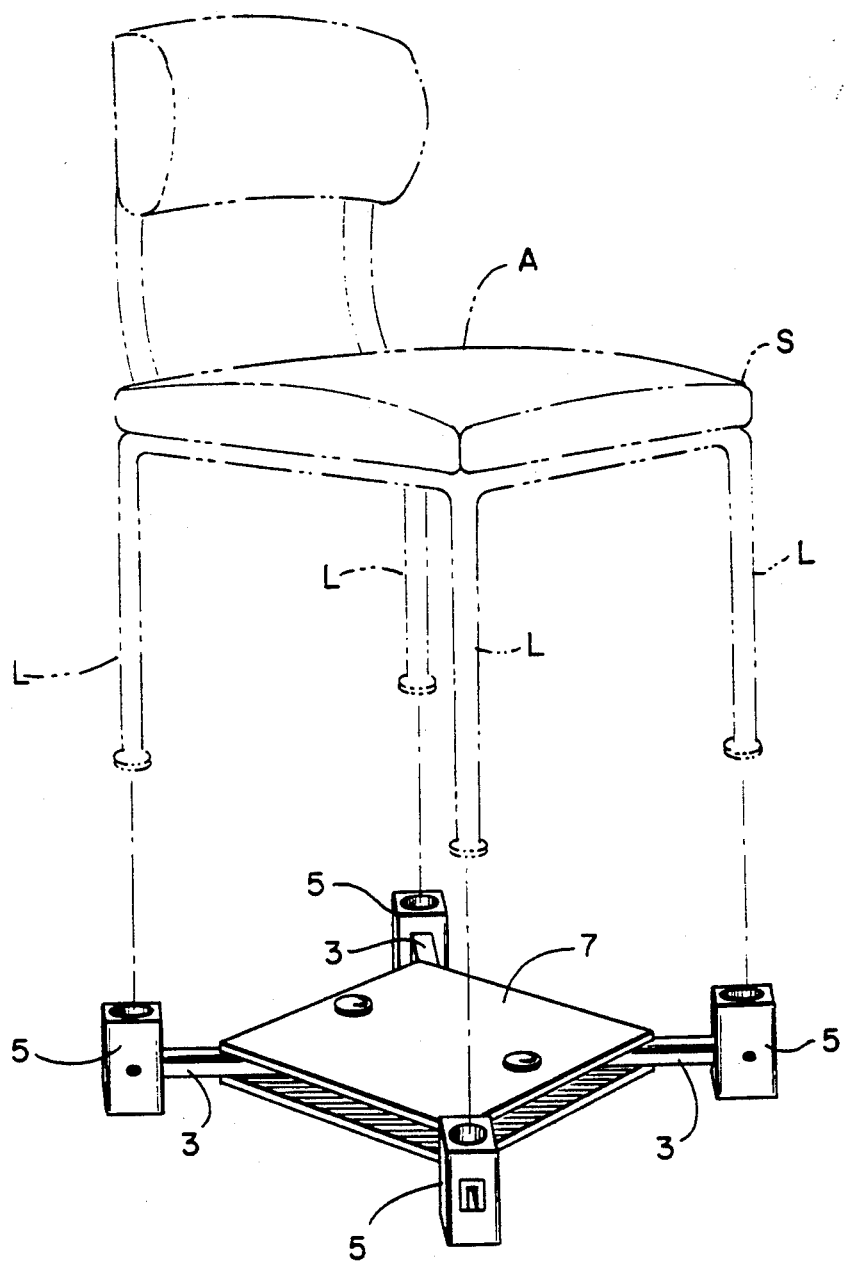
FIG. 6 illustratively shows the relationship of the elevating device with a chair.

According to the present invention there is provided an elevating device (generally designated as 1) for elevating furniture (designated as A as illustrated in FIG. 6) equipped with legs (labeled as L in FIG. 6) by placing the device beneath the legs L so as to elevate the furniture A thereby, said elevating device 1 comprising:

A) adjustable radial arms 3 of a number equal in number to the legs L of the furniture A to be elevated thereby, with said arms 3 respectively including an elongated arm terminated by a pedestal section 5 for separately and supportively engaging onto an individual leg L of furniture A; and B) a radial arm restraining assembly (generally designated as 7) for restraining the radial arms 3 at a fixed position.

Although the elevating device 1 of this invention broadly applies to legged furniture (e.g. chairs, stools, benches, tables, couches, desks, etc. ), the device is particularly well adapted to elevating seats S such as the seats S of chairs A as illustrated in FIG. 6. Thus for illustrative purposes, the elevating device 1 is often referenced to its use with a chair A notwithstanding its broader applicability to legged furniture A in general.

The device is particularly useful in elevating a seat S of a conventional chair A so as to enable a small child or small person to become comfortably seated at a proper table level. The chair A and seated person weight will normally apply sufficient pressure so as to safely maintain the chair legs L within the pedestal section 5 of arm 3. The device 1 as shown in the figures includes means for adjusting a plurality of radial arms 3 equaling in number to the number of chair legs L. Each radial arm 3 is individually equipped with a pedestal section 5 for supportively holding and restraining a leg L of the chair A at a fixed radial position. When using device 1, the pedestal sections 5 of arms 3 are each individually aligned onto a base of one leg L of the chair A by adjusting each radial arm 3 so as to supportively engage thereto. The adjusted radial arms 3 may then be immobilized against further radial movement within the device.

Figure 5:
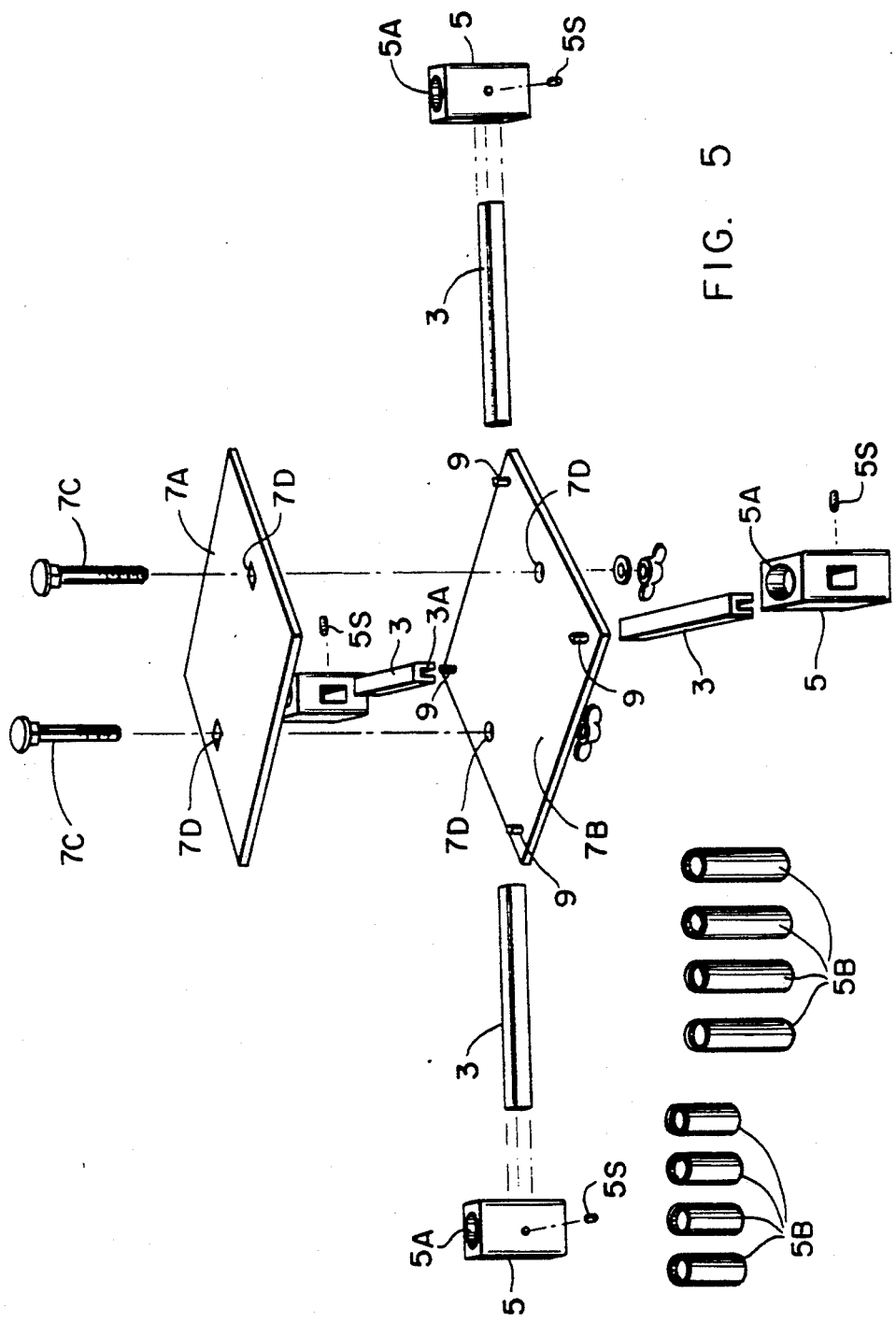
FIG. 5 is a perspective view showing in greater detail the component parts of the elevating device.

The preferred embodiments of this invention may be better understood by referring to the figures and particularly to FIG. 5 which shows in detail the individual components of device 1. The elevating device 1 as depicted in the drawings is positioned for use in combination with a four legged chair as illustrated in FIG. 6. The device 1 includes four separate radial arms 3, a pedestal assembly 5 attached at one end of arm 3 and a retaining guide 3A shown in the form of a grooved channel (e.g. see FIGS. 2, 3, 5 and 6) grooved along the underside of each arm 3. As will be more fully described later, arms 3 may be radially adjusted about an arc as well as inwardly or outwardly from a centralized point. The pedestal assemblies 5 are respectively shown as being firmly attached to one end of arms 3 by set pins 5S. Pedestal assemblies 5 are respectively equipped with a chair leg L engaging portion depicted as an open-faced and upwardly projecting socket 5A which affords adequate depth and size to safely receive and retain a base of the chair leg L therewithin.

The pedestal assemblies 5 (as illustratively depicted in the figures) may be designed and affixed onto arms 3 so as to provide an appropriate angular positioning to permit legs L to firmly seat into the socket 5A well.

In the preferred embodiments of the invention, the pedestal assemblies 5 may be constructed so as to elevate the seat S of a chair A to a height of four and one-half (4½") inches. The 4½" elevation is generally satisfactory for most small children because of the customary standardization in chair and table height.

In an alternative embodiment, the pedestal assemblies 5 may be modified so as to include means for adjusting the elevation of the legs L within the device 1. This is depicted (as shown in FIG. 5) by the pedestal assembly 5 equipped with deep throated sockets 5A suitably adapted to receive and retain socket inserts 5B therewithin. Socket inserts 5B may be provided in various heights which permits alteration of socket depth simply by emplacing an insert 5B of a different height into socket 5A. In this manner, sockets 5A may be effectively utilized in combination with a number of socket inserts 5B of varying heights to variably adjust the height within which the base of the leg L is seated within the socket 5A. Thus by employing deep throated sockets 5A, cavitated to several inches in recessed socket depth, in combination with socket inserts 5B of various lengths, the chair elevating device 1 may be accordingly adjusted to effectively accommodate children of different sizes and table heights. Thus, by progressively placing shorter socket inserts 5B into sockets 5A, seat S of chair A may be accordingly progressively lowered so as to effectively accommodate the growth of a progressively aging child. Other means for raising or lowering the height at which the base of the chair leg n is supported by the pedestal assembly 5 (e.g. such as placing a pin, adjustable bolt within the socket, etc. not shown) may also be used for this purpose. The internal dimensions of inserts 5B may be altered so as to align onto the particular shape or configuration of legs L. Smaller diameter sockets may be accordingly used for the small legged chairs A.

Figure 1:
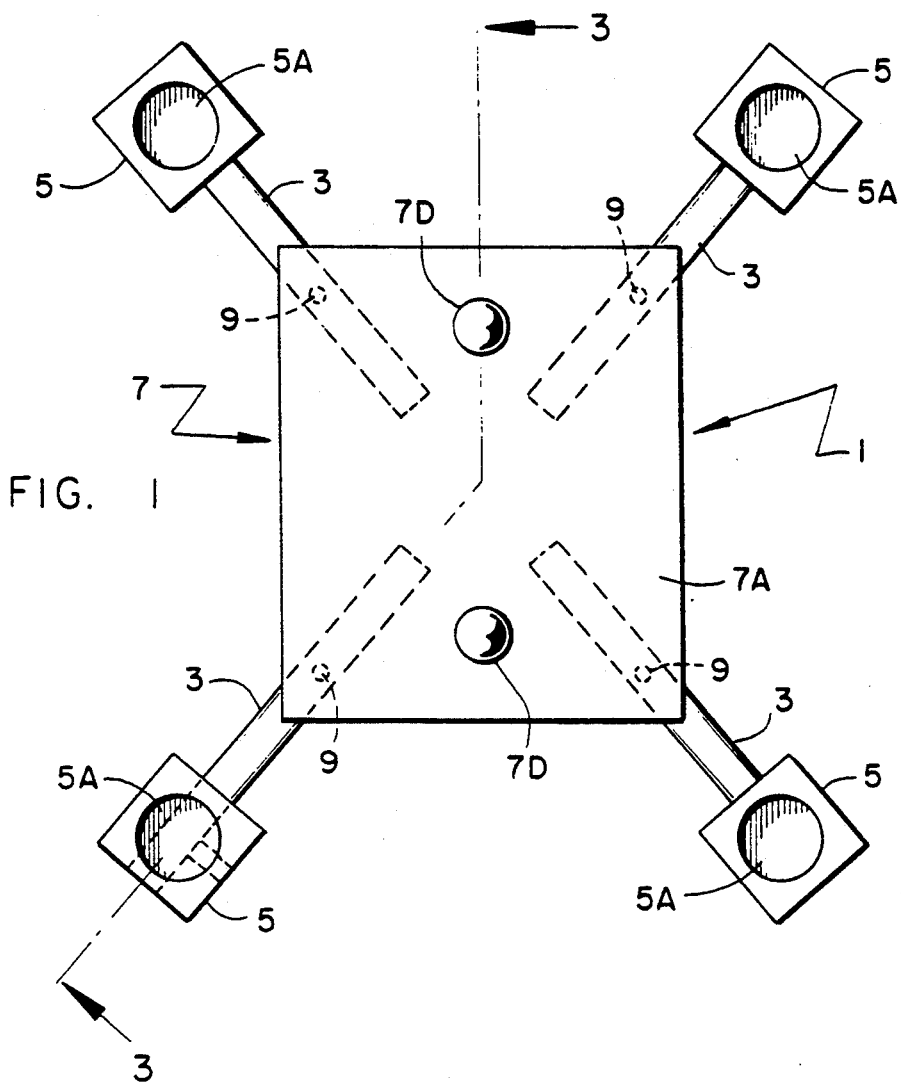
FIG. 1 is a top view of the elevating device of this invention.
Figure 2:
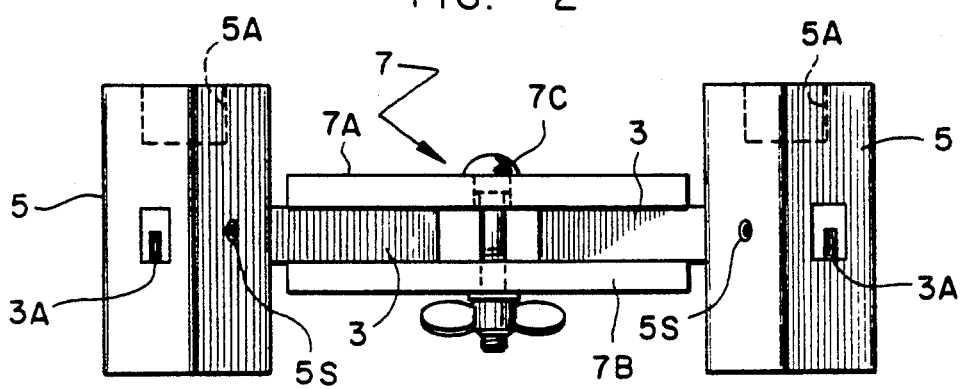
FIG. 2 is a side view of the device shown in FIG. 1.
Figure 3:
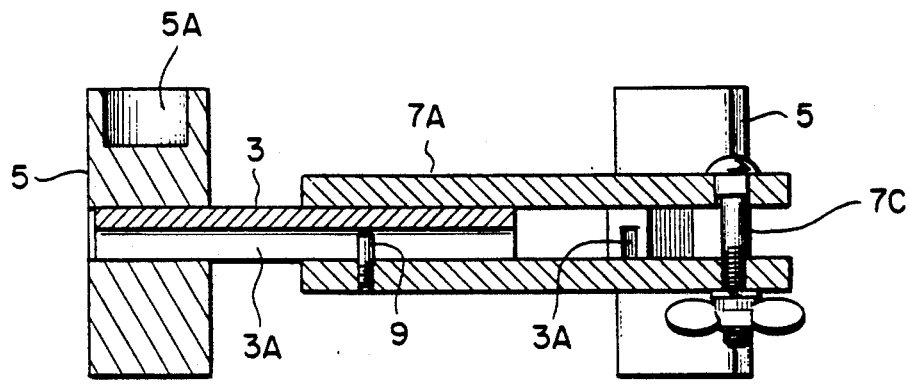
FIG. 3 is a cross-sectional view taken along line 3—3 of FIG. 1.
Figure 4:
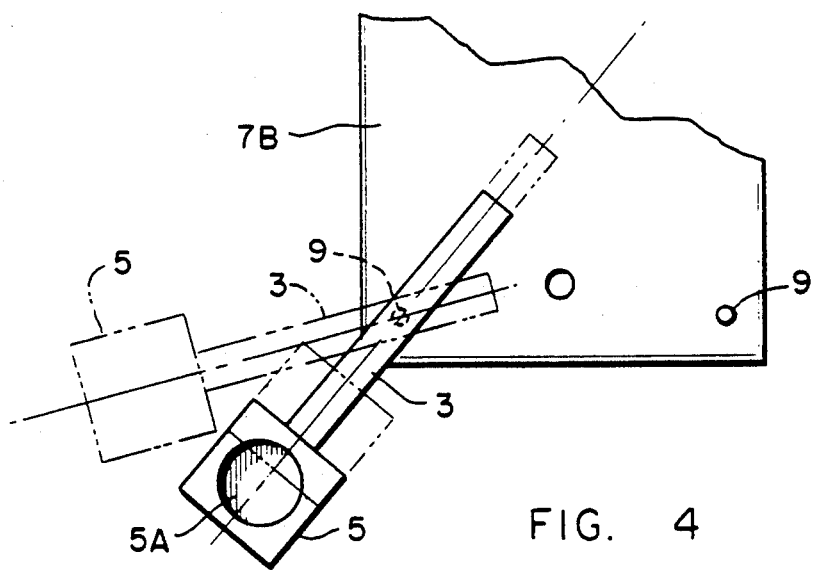
FIG. 4 is a fragmented internal top view depicting in part a radial arm of the device adjusted to different supportive positions.

The device 1 includes means for restraining (generally referenced by 7 in the figures) the radial arms 3 in an engaging and supporting relationship to the legs L of the chair A. The depicted restraining means 7 of device 1 include the top plate 7A and lower base plate 7B which biase and restrain radial arms 3 therewithin. In the preferred embodiments, arms 3 are restrained by a radial arm restraining assembly 7 equipped with a top plate member 7A for engaging onto an upper surface region of said arms 3, a bottom plate member 7B for engaging onto a lower surface region of said arms 3 and means 7C for firmly biasing 7C said arms between said bottom plate member 7B and said top plate member 7A so as to thereby firmly restrain said arms 3 at a fixed position. The upper 7A and lower 7B plates are equipped with mating bolt receiving apertures 7D for receiving biasing bolt and wing nut combinations The lower base plate 7B (as particularly well illustrated in FIG. 5) includes four projecting pins 9 positioned along the cornering margins of base plate 7B. Pins 9 are sized so as to slideably engage onto grooved channels 3A of arms 3 and thereby respectively serve as guide posts for channels 3A of arms When recessed channels 3A of arms 3 are respectively placed upon pins 9, pins 9 serve as a pivotal guide for radially adjusting the arms 3 along an arc as well as inwardly and outwardly therefrom (e.g. see FIG. 4) so as to place the pedestal assemblies 5 in alignment with the chair legs L. By simply extending or retracting the arm 3 along a radial axis and pivoting arms 3 about posts 9, sockets 5A may be accordingly adjusted so as to coincide onto the base of chair legs L.

The upper face plate 7A and the lower base plate 7B serve to sandwich and rigidly hold the adjustable arms 3 in a fixed radial position between upper plate 7A and lower plate 7B. Plates 7A and 7B may be securely biased together by simply tightening the wing nut equipped with washer and bolt combination 7C so as to firmly bias the upper face plate 7A onto arms 3 and against lower plate 7B and thereby firmly wedge arms 3 therebetween. Upon the tightening of wing nut and bolt combination 7C, the upper face plate 7A and the lower base plate 7B are drawn together so as to firmly biase, secure, and maintain radial arms 3 and the attached pedestal assemblies 5 at the correct positional alignment with legs L.

The device 1 may be constructed of a wide variety of materials (e.g. metals, plastic, wood, etc.) having sufficient structured strength to be used as a furniture elevating device herein. The use of the device 1 affords a dependable method for safely elevating furniture therewith.

What is claimed is:

1. An elevating device for elevating furniture equipped with legs by placing the device beneath the legs of legged furniture to elevate the furniture thereby, said device comprising:
   A) adjustable radial arms with said arms being individually equipped with an elongated arm terminated by a pedestal section having a socket for separately engaging onto and supporting a leg of the legged furniture; and
   B) a radial arm restraining assembly for restraining the radial arms in an immobilized position with said radial arm restraining assembly including a top plate member for engaging onto an upper surface region of said arms, a bottom plate member for engaging onto a lower surface region of said arms and means for firmly clamping said arms between said bottom plate member and said top plate member and thereby firmly restraining said radial arms in the immobilized position therebetween.

2. The device according to claim 1 wherein the device includes four adjustable radial arms.

3. The device according to claim 2 wherein the elongated arms and the pedestal sections of the adjustable radial arms are sized so as to engage and support the legs of a four legged chair.

4. The device according to claim 3 wherein the adjustable radial arms respectively include a grooved portion which serves as a guide for slideably adjusting the radial arms thereupon.

5. The device according to claim 4 wherein the bottom plate member includes four pins with each pin of said pins being sized to slideably engage onto the respective grooved portion of each radial arm.

6. The device according to claim 1 wherein said socket has an internal cavity of a sufficient size to engagingly support the leg.

7. The device according to claim 6 wherein the device includes a socket insert for insertion into the internal cavity.

8. The device according to claim 7 wherein the device includes a plurality of socket insert sets of different dimensional sizes with each of said sets including an amount of inserts at least equal in value to the number of radial arms.

9. The device according to claim 1 wherein the elevating device includes four radial arms respectively equipped with a chair leg supporting pedestal section sized to elevate a chair leg.

10. The device according to claim 9 wherein the bottom plate member includes four guides for separately guiding the radial arms about a fixed point.

11. The device according to claim 10 wherein the four guides comprise four pins projecting upwardly from the bottom plate member and each elongated arm of said radial arms includes a grooved portion sized to slideably engage onto one pin of said four pins.

12. The device according to claim 9 wherein the bottom plate member contains four upwardly projecting pins radially positioned about said bottom plate member and each elongated arm of said device includes a grooved portion for slideably engaging onto one of said pins.

13. An elevating device for elevating a chair equipped with four legs by placing the device beneath the legs so as to elevate the chair thereby, said elevating device comprising:
   A) four adjustable radial arms respectively equipped with an elongated arm terminated by a pedestal section for separately and supportively engaging onto an individual leg of the chair; and
   B) a radial arms restraining assembly equipped with a top plate, a bottom plate having four guides for separately guiding the radial arms about a fixed point and means for firmly biasing and wedging the radial arms between said top plate and said bottom plate and thereby firmly restraining the radial arms in an immobilized position therebetween, with said four guides of said bottom plate being comprised of four upwardly projecting pins radially positioned about said bottom plate and each elongated arm of said radial arms includes a grooved portion sized to slideably engage onto one of said pins.

14. The device according to claim 13 wherein the four guide pins are positioned upon the bottom plate member in a substantially equidistant chordal relationship.

15. A method for elevating a legged furniture equipped with a number of furniture legs, said method comprising:
   A) providing an elevating device equipped with adjustable radial arms equal to the number of furniture legs of the legged furniture, the radial arms are respectively terminated by a pedestal section for individually supporting a leg of the legged furniture, and a radial restraining assembly comprised of a top plate and bottom plate for restraining the radial arms at a fixed position therebetween;
   B) emplacing the radial arms between said top plate and said bottom plate so that a lower surface region of said arms engages onto said bottom plate and an upper surface region of said arms engages onto said top plate;
   C) adjusting said radial arms to that each pedestal section thereby individually supports one leg of the legged furniture at the fixed position; and
   D) immobilizing the adjusted radial arms at the fixed position with said restraining assembly by securely drawing the top plate and the bottom plate together so as to firmly wedge the radial arms between said top plate and said bottom plate.

16. The method according to claim 15 wherein the device includes four radial arms.

17. The method according to claim 16 wherein the bottom plate includes four guides for separately guiding the radial arms about the fixed position, and the radial arms are separately emplaced upon said four guides prior to immobilizing of the radial arms at the fixed position.

* * * * *